Figure 1:
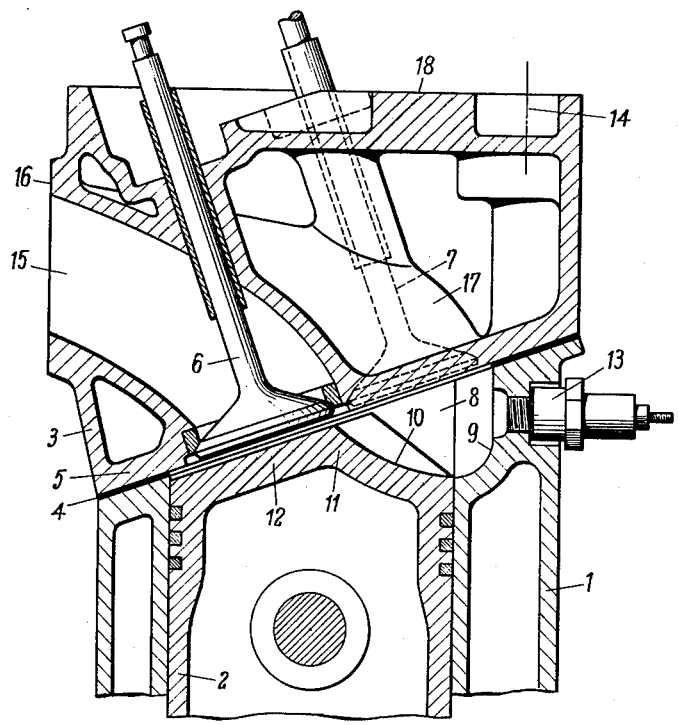

March 20, 1956

WOLF-DIETER BENSINGER ET AL 2,738,780

INTERNAL COMBUSTION ENGINE

Filed Nov. 29, 1950

Inventors
Wolf-Dieter Bensinger
Adolf Friederich Christof Wente
By Nicke and Pedlow
Attorneys

United States Patent Office 2,738,780
Patented Mar. 20, 1956

2,738,780

INTERNAL COMBUSTION ENGINE

Wolf-Dieter Bensinger, Stuttgart-Unterturkheim, and Adolf F. C. Wente, Stuttgart-Bad Cannstatt, Germany, assignors to Daimler-Benz Aktiengesellschaft, Stuttgart-Unterturkheim, Germany Application November 29, 1950, Serial No. 198,096

Claims priority, application Germany December 7, 1949

7 Claims. (Cl. 123—191)

This invention relates to an internal combustion engine in which the joint between cylinder casing and cylinder head is arranged slantingly with relation to the cylinder axis and in which the combustion chamber is limited in part by the piston crown and in part by the cylinder wall and unilaterally offset from the cylinder axis.

A primary object of the invention is to provide an improved location of the valves and preferably to permit making the valves as large as possible. Another object of the invention relates to an improved shaping of the combustion chamber. A further object of the invention is to provide a convenient design of the cylinder head in combination with the oblique joint and the arrangement of the valves in the cylinder head.

One main feature of the invention accordingly resides in that the combustion chamber is formed in part by the one oblique flank of a substantially roof-shaped piston crown and in part by a recess in the cylinder casing opening towards the cylinder, one of the valves being located in the cylinder head above the combustion chamber. It is convenient in this case to provide for an approximately hemispherical shape of the combustion chamber such that its substantially plane base is formed by the valve arranged in the lower end wall of the cylinder head, whilst the pocket-like retracted wall of the cylinder receives, for instance, a spark plug and is conveniently designed approximately cylindrically with its wall arranged in parallel relationship to the cylinder axis of the engine. The overlapping of the combustion chamber with the cylinder periphery is preferably provided at the highest point of the combustion chamber limited by the oblique wall of the cylinder head.

According to a further feature of the invention, there is a valve located also above that portion of the piston crown which closely approaches the cylinder head. The valves are preferably arranged perpendicularly with respect to the end wall or joint.

As a rule, it is advantageous to use the valve located in the cylinder head above the combustion chamber as an exhaust valve, and the valve which in the upper dead center of the piston is substantially covered by the latter as an intake valve. It may, however, be of advantage in certain cases to provide for an inverse arrangement of the valves.

The engine designed according to the invention is above all advantageous when used as an induction-system spark-ignition engine but may be employed also, for instance, as a compression-ignition or other type of engine. The injection nozzle is arranged in this case in a similar way as the spark plug preferably in the pocket-like retracted wall of the cylinder hemispherically limiting the combustion chamber.

The invention provides above all the following advantages:

The area of the end wall being enlarged by its obliquity, limiting the cylinder space and containing, for instance, the valves is still further enlarged according to the invention by the lateral projection of the combustion chamber laterally beyond the cylinder space, though this lateral extension of the combustion chamber beyond the cylinder periphery may be kept within moderate limits. The obliquity of the end wall or joint in particular permits the use of larger valves with the same cylinder diameter than it is possible with a joint extending normally to the cylinder axis. On the other hand the angle of inclination of the end wall and of the joint respectively formed by said end wall between the cylinder and the cylinder head may be made smaller with the valve dimensions being kept the same than with an oblique joint which does not overlap the combustion chamber formed by the recess in the cylinder casing.

The location of the exhaust valve above the combustion chamber provides as a further advantage that initial ignition occurring at the hot exhaust valve takes place at a point where this is comparatively harmless to the actual ignition. On the other hand, the alternative arrangement of the intake valve above the combustion chamber provides the possibility of favorable conditions of inflow, whilst simultaneously the thermal stress on the exhaust valve can be reduced owing to its being covered by the piston. According to the circumstances there may be obtained in this way in some cases a diminution of the knocking tendency.

Figure 2:
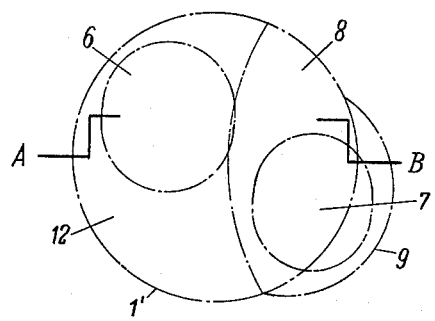

Further particulars and advantages of the invention will be more apparent from the following description of one embodiment thereof, reference being had to the accompanying drawings, in which:

Fig. 1 is a vertical section through the upper portion of an internal combustion engine along the line A–B of Fig. 2 and Fig. 2 is a plan view of the end wall limiting the cylinder against the cylinder head.

In the drawings there is shown a water-cooled cylinder casing 1 in which a piston 2 is slidable. The cylinder casing has placed thereon the cylinder head 3, the joint 4 between the cylinder casing and the cylinder head extending obliquely with respect to the cylinder axis in particular such that (above all in multi-cylinder engines) the crankshaft axis and wrist pin extend in parallel and spaced relationship with the joint. The joint 4 is formed by the lower end wall or closure 5 of the cylinder head and constitutes at the same time the upper end wall of the cylinder space. The valves 6 and 7 are arranged normally to the joint 4 and the end wall 5 respectively, of which conveniently the (e. g. somewhat larger) valve 6 controls the inlet port and the valve 7 the outlet port. As shown in particular in Fig. 2, the two valves are arranged opposite each other and offset with relation to a transverse plane extending through a portion of the recess formed by the retracted wall portion 9 and containing the cylinder axis, the valve 7 laterally overlapping the cylinder periphery 1' formed by the gliding surface of the piston.

Below the valve 7 there is arranged, eccentrically with relation to the cylinder axis and overlapping the cylinder periphery 1', the combustion chamber 8 which is limited externally by the pocket-like retracted wall 9 formed by the engine casing 1. The combustion chamber is designed substantially hemispherically in such a manner that the end wall 5 constitutes with the disc of the valve 7 the base of the hemisphere, whilst the hemispherical walls of the combustion chamber are in part formed by the retracted wall 9 of the engine casing and in part by the flattened out and trough-shaped half 10 of the roof-shaped piston crown 11. The other half 12 of the piston crown approximates in the upper dead center closely the end wall 5 and the valve 6 arranged therein respectively.

In the wall 9 of the combustion chamber there is located the spark plug 13. The valves are operated, for instance, by rocker arms (not shown in the drawing)

carried by the cylinder head. These rocker arms are actuated from a lowered camshaft by means of tappets the position of which is indicated such as at 14 and which are arranged one beside the other in conformity with the laterally offset position of the valves. The valve port 15 for the valve 6, for instance the intake port, issues at the lateral face 16 of the cylinder head which is likewise the case for the valve port 7, for instance, constituting the exhaust port. Provision may be made, however, for one of these ports (or also both of them), for instance the exhaust port, issuing at the top 18 of the cylinder head (if desired, also at the opposite side of the cylinder head).

While this description has reference to particular forms of the invention it will be obvious that various other forms and modifications may be resorted to without departing from the scope of the invention.

What I claim is:

1. An internal combustion engine comprising a cylinder housing having a cylinder with a substantially circularly-shaped retracted wall forming a recess therein, a cylinder head on said cylinder housing, the plane of separation between said cylinder head and said cylinder housing lying at an acute angle to the axis of said cylinder, said plane substantially defining an end closure for said cylinder, a piston reciprocable in said cylinder, said piston having a wrist pin and a roof shaped head having two sides, said wrist pin extending transversely to the roof-shaped head, one of said sides closely approaches said plane when said piston is in its upper position, the other side of said piston head being curved in at least one plane passing through the cylinder axis and substantially perpendicular to said wrist pin and cooperating with the portion of said end closure that is furthest from said wrist pin and said retracted wall to form a combustion chamber, a valve located in the portion of said end closure that adjoins the combustion chamber, a further valve located in said end closure in the portion where the closure is closely approached by said piston, said valves having axes substantially perpendicular to the plane of the end closure, and said valves being laterally displaced from each other and located substantially on opposite sides of a plane extending through a portion of said recess perpendicular to the axis of said wrist pin and parallel to the axis of said cylinder.

2. An internal combustion engine as defined in claim 1 wherein said other side of the piston roof and said retracted wall of the cylinder housing define the combustion chamber so that it substantially has the form of a hemisphere, the substantially flat diametric portion of which is formed principally by said first-mentioned valve.

3. In an internal combustion engine comprising a cylinder housing having a cylinder therein, a recess in said cylinder housing opening freely towards said cylinder formed in part by a retracted wall circularly shaped in a plane passing through said recess and perpendicular to the cylinder axis, a cylinder head forming an end wall for said cylinder housing, the plane of separation between said cylinder head and said cylinder housing forming an acute angle with the axis of said cylinder, a piston reciprocable in said cylinder, said piston having a wrist pin and a roof-shaped head having two sides, one side closely approaching said plane when said piston is in its upper position, the other side of said piston head cooperating with the portion of said end wall that is farthest removed from said wrist pin and forming with said recess a combustion chamber, a first valve including disc means located in the portion of said end wall that adjoins the combustion chamber, a second valve including disc means located in the portion of said end wall where said piston closely approaches said plane in its upper position, the disc means of said first-mentioned valve extending in part beyond said cylinder; the axes of said valves lying substantially on opposite sides of a plane extending through said recess and containing the longitudinal axis of said cylinder, the valve axes being substantially perpendicular to said end wall.

4. In an internal combustion engine, a cylinder housing having a cylinder therein, a recess formed by a retracted wall in said cylinder housing opening freely towards said cylinder, a substantially roof-shaped piston in said cylinder having two roof portions, a cylinder head defining an end wall for said cylinder; said recess, one of said roof portions of said piston, and a portion of said end wall defining a combustion chamber, a first valve having disc means in the other roof portion of said end wall away from said combustion chamber, and a second valve having disc means in the portion of said end wall defining said combustion chamber, the disc means of said second valve extending in part beyond the circumference of said cylinder, the disc means of said valves lying substantially on opposite sides of a plane extending through said recess and containing the longitudinal axis of said cylinder, the axes of said valves being substantially perpendicular to said end wall, said one roof portion being substantially circularly shaped in a plane including the cylinder axis and passing through said recess.

5. In an internal combustion engine, a cylinder housing having a cylinder therein, a cylinder head defining an end wall for said cylinder, said end wall forming an acute angle with the cylinder axis, a piston in said cylinder having a wrist pin and a roof-shaped head having two sides, one side of said piston head closely approaching said end wall with said piston in its upper dead center position, a recess in said cylinder near said end wall formed in part by a substantially circularly-shaped retracted wall of the cylinder housing, the other side of said piston head being curved in a plane passing through said recess and perpendicular to said wrist pin and forming with the part of said end wall farthest removed from said wrist pin and with said recess a combustion chamber, a first valve in the portion of said end wall adjacent said one side of said piston head, a second valve in the portion of said end wall adjacent said combustion chamber, and a spark plug in said recess, said valves lying substantially on opposite sides of a plane extending through said recess and passing through the cylinder axis.

6. In an internal combustion engine, a cylinder housing having a cylinder therein, a cylinder head defining an end wall for said cylider, said end wall forming an acute angle with the cylinder axis, a piston in said cylinder having a wrist pin and a two-sided roof-shaped head, one side of said piston head closely approaching said end wall with said piston in the upper dead center position thereof, a recess provided in said cylinder near said end wall formed in part by a retracted wall of the cylinder housing substantially circularly shaped in a plane perpendicular to the cylinder axis, the other side of said piston head being curved in a plane perpendicular to said wrist pin and passing through said recess and forming a combustion chamber with the part of said end wall farthest removed from said wrist pin and with said recess, an inlet valve in the portion of said end wall adjacent said one side of said piston head, an outlet valve in the portion of said end wall adjacent said combustion chamber, and a spark plug in said retracted wall, said valves lying substantially on opposite sides of a plane extending through said recess and passing through the cylinder axis, the radius of curvature of said circularly-shaped retracted wall being smaller than that of said cylinder.

7. Combination according to claim 6, wherein said other side of said piston head and said recess are curved to form a substantially hemi-spherical combustion chamber.

(References on following page)

References Cited in the file of this patent

UNITED STATES PATENTS

| | | |
|---|---|---|
| 2,028,760 | Dillstrom | Jan. 28, 1936 |
| 2,061,826 | Bremser | Nov. 24, 1936 |
| 2,094,893 | Jacoby | Oct. 5, 1937 |
| 2,126,939 | Winfield | Aug. 16, 1938 |
| 2,133,592 | Taub | Oct. 18, 1938 |
| 2,282,435 | Swaine | May 12, 1942 |
| 2,296,192 | Sanders | Sept. 15, 1942 |
| 2,380,066 | Pescara | July 10, 1945 |
| 2,428,886 | MacPherson | Oct. 14, 1947 |

FOREIGN PATENTS

| | | |
|---|---|---|
| 174,145 | Great Britain | Jan. 13, 1922 |
| 247,729 | Great Britain | Feb. 25, 1926 |